(12) United States Patent
Rummelt

(10) Patent No.: US 8,797,436 B1
(45) Date of Patent: Aug. 5, 2014

(54) ARRAY SET ADDRESSING (ASA) FOR HEXAGONALLY ARRANGED DATA SAMPLING ELEMENTS

(75) Inventor: Nicholas I. Rummelt, Crestview, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/335,912

(22) Filed: Dec. 22, 2011

Related U.S. Application Data

(60) Provisional application No. 61/426,040, filed on Dec. 22, 2010.

(51) Int. Cl.
*H04N 5/335* (2011.01)
(52) U.S. Cl.
USPC .......................................... 348/302
(58) Field of Classification Search
USPC ................... 348/249, 302; 250/369; 345/635; 235/494
See application file for complete search history.

(56) References Cited

U.S. PATENT DOCUMENTS

| | | | | |
|---|---|---|---|---|
| 5,118,948 A | * | 6/1992 | Ito et al. | 250/369 |
| 7,495,676 B2 | * | 2/2009 | van der Zijpp | 345/635 |
| 2009/0021612 A1 | * | 1/2009 | Hamilton et al. | 348/249 |

* cited by examiner

*Primary Examiner* — Twyler Haskins
*Assistant Examiner* — Akshay Trehan
(74) *Attorney, Agent, or Firm* — AFMCLO/JAZ; Fredric Sinder

(57) ABSTRACT

A new method and apparatus for addressing hexagonally arranged data sampling elements is described. Array set addressing, or ASA, is a new method for capturing information from a hexagonal grid of image sensor pixels, or any hexagonal grid of data sampling elements, for image processing or any computational manipulation of sampling data. ASA represents the hexagonal grids as a set of two rectangular arrays which can individually indexed by integer-valued row and column indices. The two arrays are distinguished using a single binary coordinate so that a full address for any point on the hexagonal grid is uniquely represented by three coordinates representing which array and the row and column. The new addressing method supports efficient linear algebra and other image processing manipulation and can be straightforwardly implemented in conventional electronic hardware and digital processing systems.

3 Claims, 3 Drawing Sheets

ARRAY SET ADDRESSING (ASA) FOR HEXAGONALLY ARRANGED DATA SAMPLING ELEMENTS

RIGHTS OF THE GOVERNMENT

The invention described herein may be manufactured and used by or for the Government of the United States for all governmental purposes without the payment of any royalty.

CROSS REFERENCE TO RELATED PATENT APPLICATIONS

This application claims priority under 35 U.S.C. §119(e) from U.S. provisional application 61/426,040, filed Dec. 22, 2010 and titled "Array Set Addressing (ASA) of Representing Optimal Sampling Lattice Data." The invention description contained in that provisional application is incorporated by reference into this description.

BACKGROUND OF THE INVENTION

The present invention relates generally to processing data captured on sensors, and more particularly to digitally processing images captured on pixel array sensors.

Modern image sensors, such as typical CCD and CMOS sensors found in cameras, typically use arrays of rectangular pixels.

From the early 1960s, however, hexagonal sampling has been known as the optimal sampling approach for isotropically band-limited two dimensional images, providing a 13.4% improvement in sampling efficiency over rectangular sampling. Hexagonal sampling provides a 13.4% improvement in sampling efficiency, meaning that an image can be represented with fewer hexagonal pixels than would be required for a rectangular representation. A hexagonal grid also has consistent connectivity since all neighboring pixels share a side. Therefore, there is no connectivity ambiguity as there is with rectangular grids, which leads to more efficient algorithms that deal with connectivity. A hexagonal grid also has greater angular resolution, equidistant spacing and a higher degree of symmetry than rectangular grids.

Moreover, as shown, for example, in many insect compound eyes and even cones in a human retina, even nature appears to recognize the advantages of hexagonal sensor arrangements.

Despite the advantages of hexagonal sampling and nature's examples, rectangular sampling is still used for virtually all digital imaging applications. Part of the reason for this is that rectangular sampling leads to nice rectangular arrays that are easy to process and store on digital computers, whereas hexagonal sampling, at least in the prior art, does not. Several addressing approaches have been developed over the years to try to remedy this, but none have matched the efficiency and convenience of a rectangular array. Simply put, no prior art efficient addressing method for hexagonal grids has been developed. For example, none of the prior art methods support efficient linear algebra and image processing manipulation. As a result, the processing overhead required to deal with addressing hexagonal sensor arrays or grids has thus far outweighed the advantages gained by sampling hexagonally.

There is, therefore, a need for a new method for addressing hexagonally arranged image sensors that produces an output that can be efficiently computationally manipulated, particularly in digital systems.

There is also a need for a new method for addressing hexagonally arranged data gathering or sampling elements generally that provides data that can be manipulated straightforwardly and efficiently.

SUMMARY OF THE INVENTION

The present invention solves the problems exhibited by prior art addressing methods with a new method for addressing hexagonally arranged image sensors, and for any hexagonally arranged data sampling elements.

A primary concept behind the present invention, called array set addressing, or ASA, is that a hexagonal grid can be represented as a set of two rectangular arrays. What's particularly new in the present invention is extending that concept and applying it to addressing.

The present invention uses a binary coordinate to indicate which array a point is on followed by familiar row and column coordinates. This provides a three coordinate system, a binary and two integers, to address the points of a hexagonal grid. As it turns out, this approach supports efficient linear algebra and image processing manipulation. A hexagonal fast Fourier transform, based on that the Fourier kernel becomes separable when using ASA coordinates, has also been shown.

BRIEF DESCRIPTION OF THE DRAWINGS

The teachings of the present invention will be better understood from the following drawings illustrating various aspects and example embodiments of the invention and its teachings.

DETAILED DESCRIPTION

A primary object of the present invention is to provide an addressing method for capturing information from a hexagonal grid of image sensor pixels, or from any data sampling elements, for computational manipulation that is efficient and fast.

Additional information describing the invention, including additional details on how to make and use the invention and best modes, is in Rummelt and Wilson, "Array Set Addressing: Making the World Safe for Hexagonal Imaging," *Proceedings of SPIE* (*Proc. SPIE*) 7532, 75320D (January 2010); Rummelt and Wilson, "Array Set Addressing: Enabling Technology for the Efficient Processing of Hexagonally Sampled Imagery," *Journal of Electronic Imaging*, 20(2), 023012 (Jun. 3, 2011); and, Rummelt, Barrows and Massie, "Hexagonal Sampling in the Infrared Domain: An Introduction to Array Set Processing," *Proceedings of SPIE* (*Proc. SPIE*) 8012, 801201 (Apr. 25, 2011), all three of which are fully incorporated by reference into this description.

Figure 1:
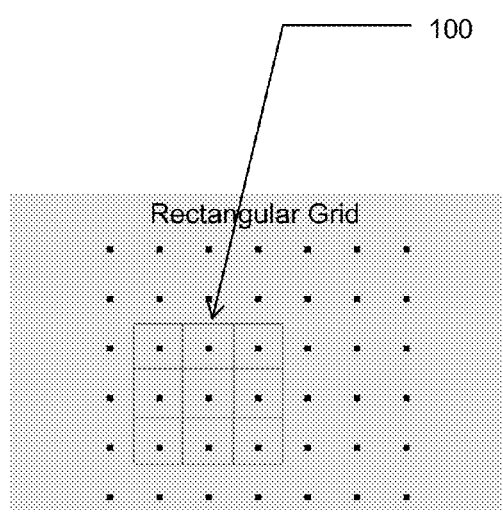
FIG. 1 is a representative view of a rectangular grid arrangement for sampling isotropically band-limited two dimensional signals.
Figure 2:
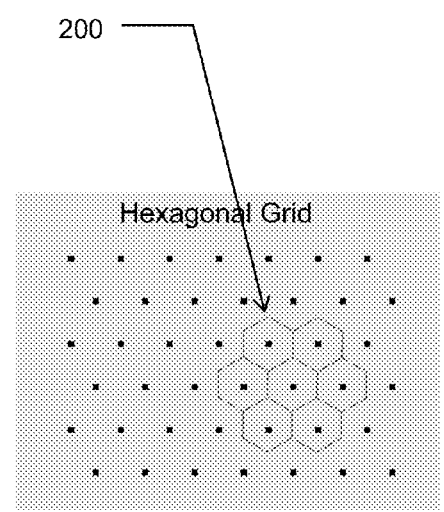
FIG. 2 is a representative view of a hexagonal grid arrangement for sampling isotropically band-limited two dimensional signals.

FIG. 1 and FIG. 2 are representative views of rectangular 100 and hexagonal grid 200 arrangements for sampling isotropically band-limited two dimensional signals.

Visual inspection of the two approaches shows that a hexagonal grid has consistent connectivity since all neighboring pixels share a side. Therefore, there is no connectivity ambiguity as there is with rectangular grids, which leads to more efficient algorithms that deal with connectivity. The hexagonal grid also has greater angular resolution, equidistant spacing and a higher degree of symmetry than rectangular grids.

Figure 3:
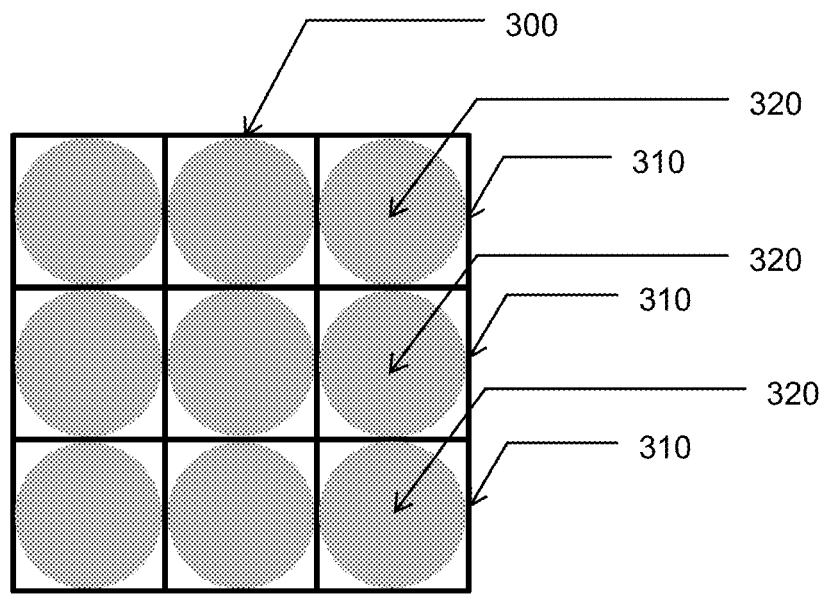
FIG. 3 is a geometric view of the packing of the signal spectrum of an isotropically band-limited two-dimensional signal into a rectangular array.
Figure 4:
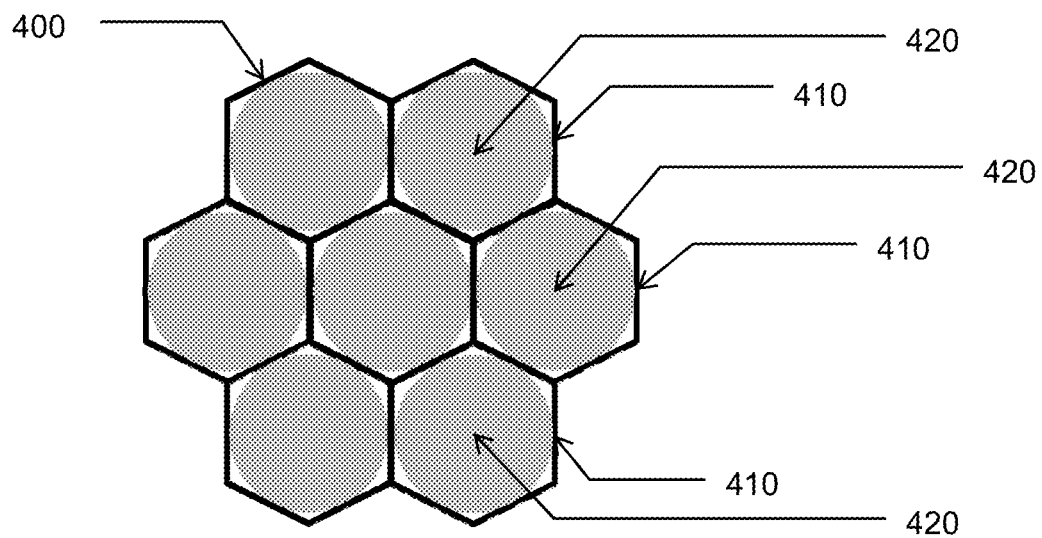
FIG. 4 is a geometric view of the packing of the signal spectrum of an isotropically band-limited two-dimensional signal into a hexagonal array.

FIG. 3 and FIG. 4 are geometric views of the packing of the signal spectrum of an isotropically band-limited two-dimensional signal into rectangular 300 and hexagonal 400 arrays of rectangles 310 and hexagons 410.

It is not always clear why hexagonal sampling is the optimal approach for isotropically band-limited signals. The geometry of spatial sampling determines spectral tiling in the frequency domain, so that hexagonal sampling leads to a hexagonal tiling of the signal's spectrum and rectangular sampling leads to a rectangular tiling. The density of samples in the spatial domain is proportional to the area of the tiles. Therefore, the number of samples per unit area in the spatial domain determines the range of frequencies that can be captured alias-free or, in other words, the band limit. Because these are isotropically band-limited signals, the spectrum fits within a circle. And, when the areas are the same, a larger circle 420 can fit within a hexagon 410 than can a circle 320 fit within a rectangle 310. The ratio of the areas of the inscribed circles is exactly the square-root of 3 to 2, or approximately 0.866, which is a difference of 13.4%.

Figure 5:
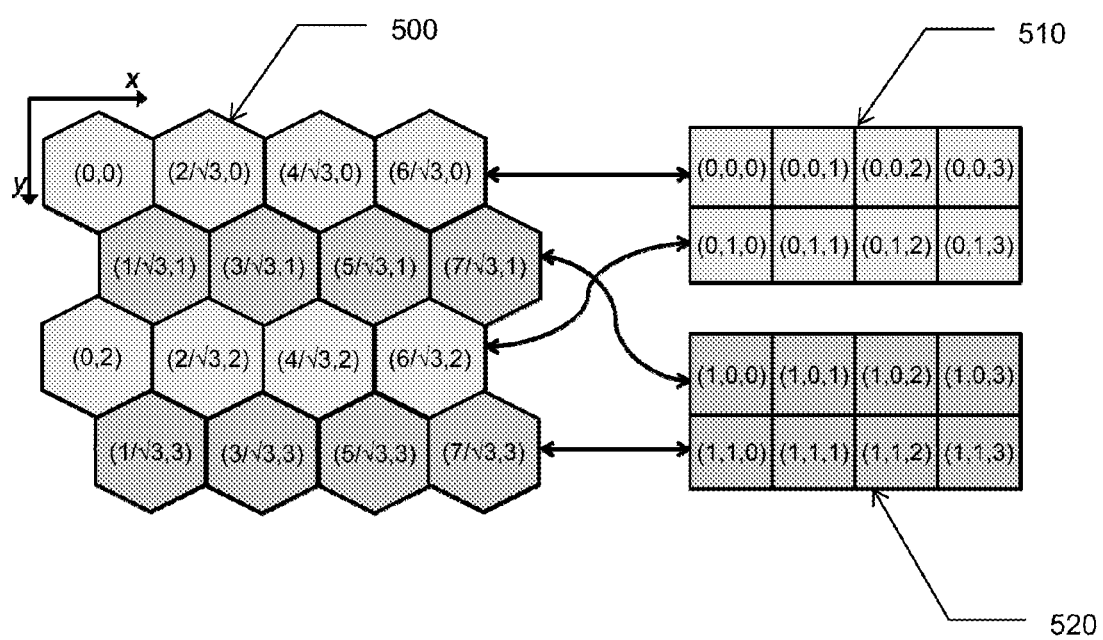
FIG. 5 is a schematic view of an example embodiment of the present invention showing the addressing of a hexagonal grid by separating it into two separate rectangular arrays.

FIG. 5 is a schematic view of an example embodiment of the present invention showing the addressing of a hexagonal grid 500 by separating it into two separate rectangular arrays 510 and 520.

Array set addressing (ASA) solves the problems of the prior art by representing the hexagonal grid as a set of two rectangular arrays which can be individually indexed by integer-valued row and column indices. The two arrays are distinguished using a single binary coordinate so that a full address for any point on the hexagonal grid is uniquely represented by three coordinates:

$$(a,r,c) \in \{0,1\} \times Z \times Z(1), \quad (1)$$

where the coordinates represent the array, row, and column respectively.

This elegant addressing scheme significantly outperforms other hexagonal addressing approaches.

As described in the papers referenced at the beginning of this detailed description, using ASA, hexagonally sampled images can be efficiently stored and processed on existing digital hardware. Efficient vector operations have been developed and proofs made to show that that ASA satisfies the properties of a module over the ring of integers. Operations on ASA images such as coordinate conversion, Euclidean distance, city-block distance, convolution, gradient estimation, edge detection, downsampling, wavelet decomposition and Fourier transform have been developed and shown to be efficient. It even turns out that the hexagonal Fourier kernel becomes separable in ASA, leading directly to a radix-2 decimation hexagonal fast Fourier transform (HFFT).

Some examples of the computational abilities of ASA are briefly described in following Tables 1-4.

TABLE 1

Hexagonal Neighbors

For any pixel (a, r, c), it's neighbors are:

```
         (1-a,      (1-a,
       r-(1-a),    r-(1-a),
       c-(1-a))    c+a )

(a, r, c-1)  (a, r, c)  (a, r, c+1)

(1-a,      (1-a,
         r+a,       r+a,
       c-(1-a))     c+a)
```

Finding a neighbor's address is an $O((\log N)^2)$
operation using spiral addressing
No connectedness ambiguity - a neighbor is
a neighbor For any pixel in ASA, finding its neighbors is done by simple coordinate offsets as shown in Table 1. In contrast, finding a neighbor's address in spiral addressing is an $O((\log N)^2)$ operation. Also, as previously noted, there is no connectedness ambiguity as there is with rectangular pixels.

TABLE 2

Distance Measures

Converting ASA to Cartesian is a simple matrix multiplication:

$$\begin{bmatrix} x \\ y \end{bmatrix} = \begin{bmatrix} 1/2 & 0 & 1 \\ \sqrt{3}/2 & \sqrt{3} & 0 \end{bmatrix} \begin{bmatrix} a \\ r \\ c \end{bmatrix} = \begin{bmatrix} (a/2+c) \\ (\sqrt{3})(a/2+r) \end{bmatrix}$$

Euclidean distance (on the image plane) between two points
$p_1 = (a_1, r_1, c_1)$ and $p_2 = (a_2, r_2, c_2)$:

$$d(p_1, p_2) = \sqrt{\left(\left(\frac{a_1-a_2}{2}\right)+(c_1-c_2)\right)^2 + (3)\left(\left(\frac{a_1-a_2}{2}\right)+(r_1-r_2)\right)^2}$$

"City-Block" distance (on the image plane) between two points
$p_1 = (a_1, r_1, c_1)$ and $p_2 = (a_2, r_2, c_2)$:

$$U = (c_1 - c_2) - (r_1 - r_2)$$

$$V = (a_1 - a_2) + (2)(r_1 - r_2)$$

$$d_6(p_1, p_2) = \begin{cases} |U| + |V| & \text{if } U \text{ and } V \text{ have the same sign} \\ \max(|U|, |V|) & \text{otherwise} \end{cases}$$

Table 2 shows the computational simplicity of using ASA for distance measures. Converting ASA to Cartesian coordinates is a simple matrix multiplication. Once you have these expressions for x and y, it is very easy to convert formulas that have been developed in Cartesian coordinates to an ASA representation, such as the familiar formula for Euclidean distance. Table 2 shows the results from converting formulas from an oblique axes representation to ASA to create an ASA formula for the "City-Block" distance problem.

TABLE 3

Vector Operations

Let $p_i = \begin{pmatrix} a_i \\ r_i \\ c_i \end{pmatrix} \in ASA$

| Operation | Definition |
|---|---|
| Addition | $p_i = \begin{pmatrix} a_i \\ r_i \\ c_i \end{pmatrix} \in ASA$ |
| Negation | $p_1 + p_2 = \begin{pmatrix} a_1 \oplus a_2 \\ r_1 + r_2 + (a_1 \wedge a_2) \\ c_1 + c_2 + (a_1 \wedge a_2) \end{pmatrix}$ |
| Subtraction | $-p = \begin{pmatrix} a \\ -r - a \\ -c - a \end{pmatrix}$ |
| Scalar Multiplication | $kp = \begin{pmatrix} (ak) \bmod 2 \\ kr + (a)\lfloor k/2 \rfloor \\ kc + (a)\lfloor k/2 \rfloor \end{pmatrix}, k \in N$ and $-kp \equiv k(-p)$ |

Table 3 shows the simplicity of ASA when applied to basic vector operations such as addition, negation, subtraction and integer scalar multiplication. Recall that the array coordinate is a binary. This is just an XOR operation and these are AND operations, which are both single gate operations in hardware. A "mod 2" operation just takes the least significant bit, and taking the floor of a divide-by-2 operation is just a 1 bit right shift. When represented in binary in hardware, these are very efficient operations.

TABLE 4

AZA is a Z-Module
ASA satisfies the 8 properties of a Z-module:

| Property | Significance |
|---|---|
| Commutativity of addition | $p_1 + p_2 = p_2 + p_1$ |
| Associativity of addition | $p_1 + (p_2 + p_3) = (p_1 + p_2) + p_3$ |
| Identity element of addition | $\exists 0 \in ASA: p + 0 = p, \forall p \in ASA$ |
| Inverse elements of addition | $\exists q \in ASA: p + q = 0, \forall p \in ASA$ |
| Distributivity of scalar multiplication (wrt vector addition) | $k(p + q) = kp + kq$ |
| Distributivity of scalar multiplication (wrt scalar addition) | $(k + j)p = kp + jp$ |
| Compatibility of scalar multiplication (with multiplication of scalars) | $k(jp) = (kj)p$ |
| Identity element of scalar multiplication | $1p = p$ |

From the definitions in Table 3, proofs have been developed showing that AZA satisfies the eight properties that are required for a space to be a module over the ring of integers, as shown here in Table 4. A module is basically a generalization of a vector space where the scalars (here, k and j) are constrained to be from a ring rather than from a field.

The teachings of the disclosed new hexagonal addressing method will find application in other areas where hexagonal arrays are inherently more efficient than other arrays. For example, ASA can be used for two-dimensional grid-based application, including where there is no sensor, such as hexagonal interconnection networks.

Similarly, the advantages of hexagonal sampling are not limited to the visible domain and can be equally realizable in, for example, the infrared domain. The development of this truly efficient addressing scheme for hexagonally sampled images is beginning to spur a renewed interest in development of sensors that sample hexagonally. Because of the fundamental nature of image sampling and addressing, the advantages to be gained by sampling hexagonally are independent of signal frequency band. Imaging applications in all frequency bands, for example, visible, infrared, x-ray, etc., can now exploit the advantages of hexagonal sampling without the burden of a computationally complex addressing scheme.

Other example embodiments from the present invention's teachings of array set addressing have not been shown, but will be added in a preliminary amendment that will include one or more block diagrams of hardware implementations inherent in this description, but better describing uses of the invention and its teachings.

Various modifications to the invention as described may be made, as might occur to one with skill in the art of the invention, within the scope of the claims. Therefore, all contemplated example embodiments have not been shown in complete detail. Other embodiments may be developed without departing from the spirit of the invention or from the scope of the claims.

I claim:

1. A method for capturing information from a hexagonal grid of data sampling elements, the data sampling elements arranged such that each data sampling element is centered on a point of the hexagonal grid, comprising the step of electronically capturing the addresses of the data sampling elements as a set of two interleaved rectangular arrays, wherein each array element comprises three coordinates:
    (a) a first coordinate representing which rectangular array, determined as every other grid row of data sampling elements;
    (b) a second coordinate representing the row of the data sampling element relative to its array;
    (c) a third coordinate representing the column of the data sampling element relative to its array;
    (d) where each first coordinate is represented as a, each second coordinate is represented as r, and each third coordinate is represented as c; and,
    (e) converting captured array elements to corresponding Cartesian array elements having first and second rectangular coordinates x and y, comprising the step of performing a matrix multiplication of captured array elements as:

$$\begin{bmatrix} x \\ y \end{bmatrix} = \begin{bmatrix} \frac{a}{2} + c \\ (\sqrt{3})\left(\frac{a}{2} + r\right) \end{bmatrix}.$$

2. An electronic circuit for capturing information from a hexagonal grid of sensor elements, the sensor elements arranged such that each element is centered on a point of the hexagonal grid, comprising:
    (a) a first circuit component configured to capture the addresses of the sensor elements as a set of two interleaved rectangular arrays, wherein each array element comprises three coordinates:
        (i) a first coordinate representing which rectangular array, determined as every other grid row of sensor elements, represented as a;

(ii) a second coordinate representing the row of the sensor element relative to its array, represented as r; and, (iii) a third coordinate representing the column of the sensor element relative to its array, represented as c;

(b) a second circuit component configured to convert captured array elements to corresponding Cartesian array elements having first and second rectangular coordinates x and y, by performing a matrix multiplication of captured array elements as:

$$\begin{bmatrix} x \\ y \end{bmatrix} = \begin{bmatrix} \frac{a}{2} + c \\ (\sqrt{3})\left(\frac{a}{2} + r\right) \end{bmatrix}.$$

3. A method for capturing information from a hexagonal grid of data sampling elements, the data sampling elements arranged such that each data sampling element is centered on a point of the hexagonal grid, and converting the hexagonal grid positions to corresponding Cartesian grid positions, comprising the steps of:

(a) electronically capturing the addresses of the data sampling elements as a set of two interleaved rectangular arrays, wherein each array element comprises three coordinates:

(i) a first coordinate representing which rectangular array, determined as every other grid row of data sampling elements, represented as a;

(ii) a second coordinate representing the row of the data sampling element relative to its array, represented as r; and, (iii) a third coordinate representing the column of the data sampling element relative to its array, represented as c; and, (b) converting captured array elements to corresponding Cartesian array elements having first and second rectangular coordinates x and y, comprising the step of performing a matrix multiplication of captured array elements as:

$$\begin{bmatrix} x \\ y \end{bmatrix} = \begin{bmatrix} \frac{a}{2} + c \\ (\sqrt{3})\left(\frac{a}{2} + r\right) \end{bmatrix}.$$

* * * * *